May 11, 1954
H. C. ADY
2,677,925
ROTARY MULCHER ATTACHMENT FOR WORKING THE CENTER RIDGE BETWEEN GANGS OF DISK HARROWS
Filed Dec. 19, 1949
2 Sheets-Sheet 1
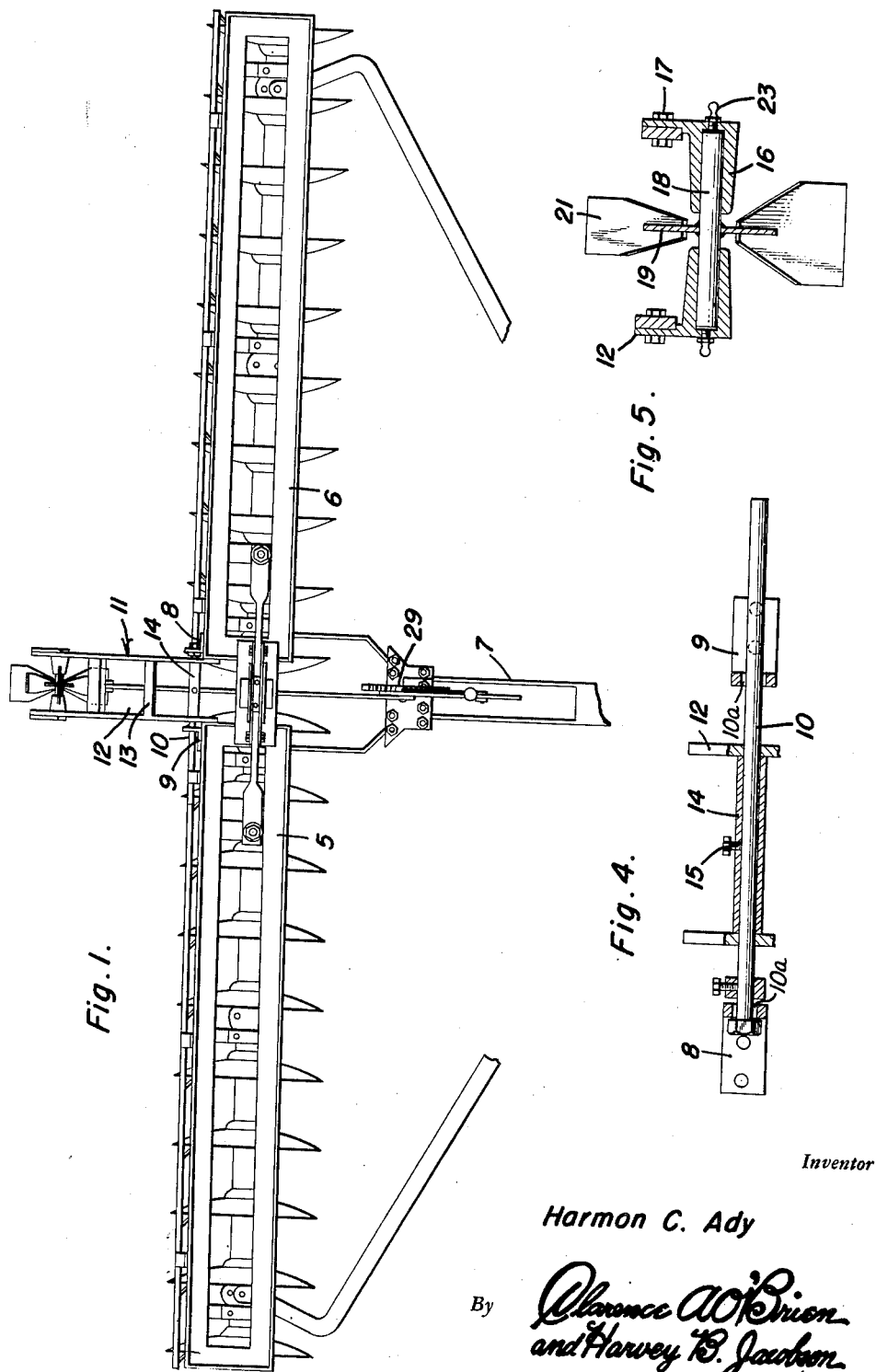
Inventor
Harmon C. Ady
By Clarence A. O'Brien
and Harvey B. Jackson
Attorneys

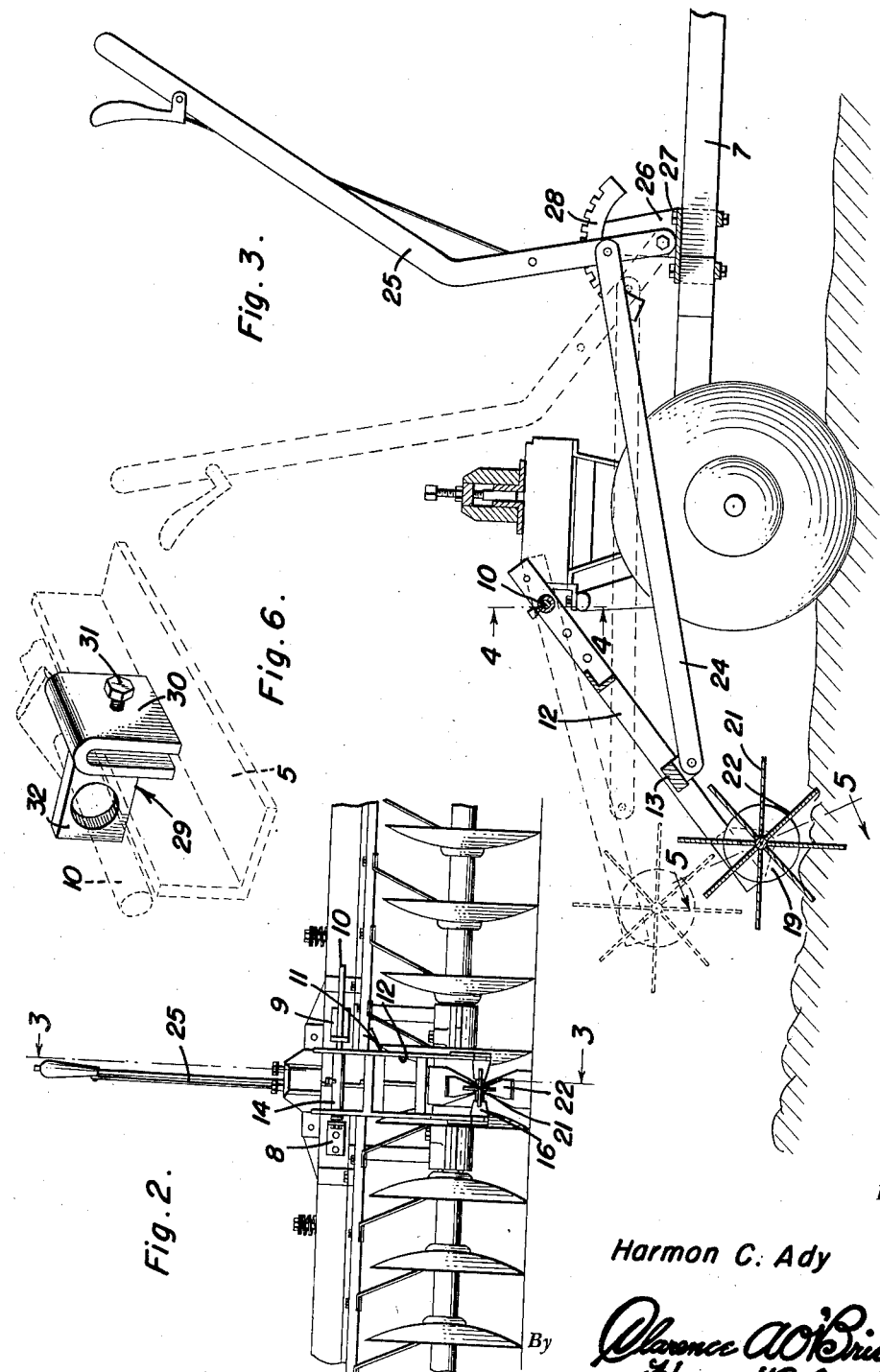

Patented May 11, 1954

2,677,925

UNITED STATES PATENT OFFICE 2,677,925

ROTARY MULCHER ATTACHMENT FOR WORKING THE CENTER RIDGE BETWEEN GANGS OF DISK HARROWS

Harmon C. Ady, Enders, Nebr., assignor of fifty per cent to Marvin P. Grim, Imperial, Nebr.

Application December 19, 1949, Serial No. 133,799

2 Claims. (Cl. 55—82)

The present invention relates to new and useful improvements in harrow attachments and more particularly to a rotary shovel or mulcher for pulverizing or cultivating the ridge of earth left between gangs of disc harrows.

In cultivating with gangs of disc harrows the inner ends of the gangs are usually spaced from each other to leave a ridge of earth between the gangs and which remains uncultivated.

It is accordingly an object of the present invention to provide a rotary shovel or mulcher which works between the inner ends of the gangs of harrows to eliminate and remove the center ridge of earth so that the entire field will be uniformly cultivated.

An important object of the invention is to provide an attachment of this character which may be easily and quickly attached in position to the cultivator without necessitating any changes or alterations in the construction thereof and which may be easily and quickly removed, when desired.

A still further object is to provide means for raising and lowering the rotary shovel into and out of earth working position.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a rear elevational view.

Figure 3 is an enlarged transverse sectional view taken on a line 3—3 of Figure 2.

Figure 4 is an enlarged sectional view taken on a line 4—4 of Figure 3.

Figure 5 is an enlarged transverse sectional view of the rotary shovel taken on a line 5—5 of Figure 3 and Figure 6 is an enlarged perspective view of a modified attaching bracket for the swingable frame of the shovel.

Referring now to the drawings in detail wherein for the purpose of illustration I have disclosed a preferred embodiment of the invention, the numerals 5 and 6 designate gangs of disc harrows carried at the rear end of a central frame 7.

Angle brackets 8 and 9 are bolted or otherwise suitably attached to the inner ends of frames 5 and 6 and in which openings 10a are formed to receive and support a shaft 10 with sufficient freedom to permit a desired angling of the gangs. A rotary shovel or mulcher frame is designated generally at 11 and comprises a pair of side rails or arms 12 rigidly connected in spaced parallel relation to each other by cross bars 13 and provided at their front ends with a sleeve 14 between rails 12 and secured to the shaft 10 by a set screw 15 to center the rotary shovel between the gangs.

A bearing 16 is secured to the rear end of each arm or rail 12 by bolts and nuts 17, the inner ends of the bearings being spaced from each other and in which a shaft 18 is journaled. A disc or hub 19 is welded or otherwise suitably secured to the central portion of shaft 18 and to which a plurality of relatively long blades 21 and a plurality of relatively short blades 22 are secured to project radially from the hub. The blades 21 and 22 have their surfaces positioned transversely with respect to disc or hub 19 with blade 21 relatively narrow with respect to blades 22 as well as being shorter in length. The outer ends of bearings 16 are provided with grease fittings 23 to lubricate shaft 18.

An arm 24 is pivotally attached at its rear end to one of the cross bars 13 of frame 11, adjacent the rear end of the latter, and the front end of arm 24 is pivoted to a lever 25 which is pivoted at its lower end to a bracket 26 secured to frame 7 by bolts and nuts 27. A quadrant 28 is also secured to bracket 26 and with the teeth of which a locking dog 29 is engaged to lock lever 25 in its swingably adjusted position.

In the operation of the device, lever 25 is moved forwardly to pull rotary shovel frame 11 downwardly as shown by the full lines in Figure 3 of the drawings whereby the blades 21 and 22 work the center ridge of the soil left between the inner ends of disc gangs 5 and 6. Blades 21 and 22 are raised out of working position by swinging lever 25 rearwardly causing arm 24 to push frame 11 upwardly into the dotted line position shown in Figure 3.

In Figure 6 I have illustrated a modified bracket 29 for shaft 10 and which includes a channel member 30 resting on the upper edge of frame 5 or 6 of the harrow and held thereon by a set screw 31. An apertured lug 32 projects rearwardly from channel member 30 to slidably support shaft 10.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination, a harrow including a pair of disk gang assemblies connected to each other in end to end relation, a pair of apertured brackets carried by the gangs adjacent their inner ends, a shaft having a diameter substantially smaller than the size of said apertures supported in the apertures of the brackets in bridging relation at the inner ends of the gangs, a frame composed of a pair of rearwardly inclined side arms pivoted at their upper ends on the shaft for vertical swinging movement of the frame about the shaft, a rotary earth-working element journaled between the rear lower ends of the arms, and means raising and lowering the frame to move the earth-working element into and out of earth-working position.

2. In combination, a harrow including a pair of disk gang assemblies connected to each other in end-to-end relation, a pair of brackets carried by the gangs adjacent their inner ends, said harrows including an upstanding flange and said brackets including an inverted channel member adapted for resting on the upper edge of said flange and said brackets also including an apertured lug projecting laterally from one side of the channel member, a shaft having a diameter substantially smaller than the size of the apertures in the lugs and supported in said apertures in bridging relation with the inner ends of the gangs, a vertically swingable frame pivoted at one end on the shaft between the brackets, a rotary earth working element journaled at the free end of the frame, and vertical adjusting means for the frame.

References Cited in the file of this patent

UNITED STATES PATENTS

| Number | Name | Date |
|---|---|---|
| 981,398 | Durbin | Jan. 10, 1911 |
| 989,338 | Corne | Apr. 11, 1911 |
| 1,087,389 | McLeod | Feb. 17, 1914 |
| 1,155,657 | Helin | Oct. 5, 1915 |
| 1,926,381 | Hoffman | Sept. 12, 1933 |
| 2,271,713 | Raska | Feb. 3, 1942 |

FOREIGN PATENTS

| Number | Country | Date |
|---|---|---|
| 55,368 | Germany | Sept. 10, 1912 |
| 71,763 | Norway | Mar. 3, 1947 |